UNITED STATES PATENT OFFICE.

WILLIS H. POST, OF BATTLE CREEK, MICHIGAN, ASSIGNOR TO POSTUM CEREAL COMPANY, LIMITED, OF BATTLE CREEK, MICHIGAN, A PARTNERSHIP.

BEVERAGE EXTRACT.

1,031,962.      Specification of Letters Patent.      Patented July 9, 1912.

No Drawing.      Application filed August 25, 1911. Serial No. 645,900.

*To all whom it may concern:*

Be it known that I, WILLIS H. POST, of Battle Creek, Michigan, have invented a new and useful Improvement in Beverage Extracts, which invention is fully set forth in the following specification.

This invention relates to a beverage extract, and has for its object to provide a water-soluble extract from roasted carbohydrate materials, such as cereals, fruits, sugar and the like, which, when dissolved in water, possesses both a pleasant bitter flavor and empyreumatic aroma and is healthful and nutritious while avoiding the presence of tannins and alkaloids which are to many injurious.

Table beverages have heretofore been prepared from roasted peas, beans, acorns, wheat and other cereals by steeping or percolating the roasted material and serving in a manner similar to serving coffee. It is found by experience that the time required for the preparation of such beverages is practically prohibitive of its use where quick service is demanded, as in hotels and restaurants. Furthermore, to secure the best results in making such beverages, care is required according to the nature of the preparation, in the matter of time, temperature, and proportions of water to the materials, whereby the beverage may be clear and possess to the fullest extent the flavor and desirable properties characteristic of the roasted product.

I overcome the above objections by making a quickly soluble solid extract of the roasted materials, and I prepare this extract in a manner such that the characteristics of flavor and aroma of the roasted materials are retained unchanged in the solid extract, and all or so much of extractive matter is taken out of the materials as is desirable to secure the best results in the matters of taste, flavor and character of nutritive material in the finished product. To facilitate solution of the solid extract, I find it desirable to prepare it in a rather coarse granular form. This condition in general better resists the hygroscopic tendencies of the product, although I may prepare it in any degree of fineness desired.

The inventive idea involved is capable of expression in a variety of ways, one of which is hereinafter specifically described, but the specific example given is solely for the purpose of illustrating the invention, and not for the purpose of defining the limits thereof, reference being had to the claims for this purpose.

While I may use, as starting materials, for making the roasted product from which I prepare the soluble extract, grains or cereals, such as wheat, rye, corn, barley, malted or unmalted, or other like starchy products or mixtures of the same, and saccharine material added thereto, such as New Orleans molasses, sugar, syrups, either cane or glucose, and even figs, prunes or other fruits, I prefer to employ a mixture of wheat, bran and New Orleans molasses. Ordinary wheat bran is mixed with New Orleans molasses and steamed in order to render the mass homogeneous, dried and roasted, the temperature being carried to the point of browning and thoroughly caramelizing the sugar of the molasses. A slight carbonizing is not injurious and brings out desirable flavors. Wheat, preferably whole wheat, is roasted to a dark brown color to effect dextrinizing the starchy contents of the grain, then ground to rather coarse powder and mixed with the roasted bran and molasses. The proportions of the ingredients may vary within wide limits, dependent on the characteristics desired to be imparted to the final product. Having prepared the roasted product from which it is desired to make the solid extract, I next treat the product with water, to dissolve out its soluble constituents. Either a part or all the soluble constituents may be removed, depending on the desired characteristics of the solid extract in matters pertaining to flavor, aroma, etc. The extraction may be effected by treating the roasted product with either cold or warm water, or by boiling the same therewith, but I prefer to use percolation with water of moderate temperature, at about 50° to 60° C., thereby obtaining usually a clear solution which is ready for evaporation without undergoing a separate step of filtration. Furthermore, percolation permits control of the extraction whereby extracts of different strength and qualities may be prepared, if desired. While the aqueous extract from roasted wheat, bran and molasses, prepared as above described, may and sometimes does yield as high as 50% in soluble extractive matter, and makes an excellent beverage, yet an extract of 30% possesses in a marked degree the desirable properties of the roasted product. No particular apparatus for percolating need be described, as it forms no part of the present invention, such devices being well known and on the market. The clear aqueous solution is next concentrated by evaporation. This operation is preferably conducted *in vacuo*, such as obtained in a vacuum evaporation pan, and with care to prevent loss of volatile matters other than water. While the temperature in the vacuum pan may vary within considerably wide limits during the early stages of evaporation, a temperature in the neighborhood of 50° C. has been found satisfactory. This operation is continued until the aqueous extract is concentrated to a point where it contains from about 30 to 50% solids in solution. The strength of this extract will vary somewhat according to the plan adopted for the final drying, which may be conducted on trays in a vacuum chamber or a rotary drum *in vacuo*. Open evaporation and drying is not advisable. In case a vacuum pan is used for the final evaporation, the aqueous extract may be concentrated to the point of containing about 30 to 50% solids. It is obvious that the same pans as used for concentration may be used for drying, though it is preferable to transfer the concentrate to new pans. While water to considerable extent is present in the mass, no further precautions are needed as to temperature than those taken during the initial evaporation. When, however, the moisture is reduced to only a few per cent., the temperature should be so regulated that overheating of the product does not occur. A temperature of about 60° C. has been found to be safe for this purpose. At the very end of drying, and while traces of water still remain, the temperature may and preferably is lowered, permitting the heat of the mass to drive off the last portions while cooling. The product is scraped or otherwise removed from the pan, and coarsely granulated or ground, as desired. For reasons noted above, the granular condition is preferred. In the event that film evaporation is practised with a revoluble drum in a vacuum chamber, the first concentration or density of the aqueous extract is adjusted to the requirements of the particular drum apparatus employed, such as in matters of surface exposed, speed of rotation, temperature, etc. In general, however, the fluid extract may have a strength of about 30% when applied to the drum. In drying the extract on a drum, it is particularly desirable to remove the solid mass from the drum surface before complete dryness is attained, to avoid overheating the product, the heat retained by the mass being relied on to remove the last portions of moisture while the product is still inside the vacuum chamber. The dried extract is comminuted preferably in a coarse granular form, and is ready for packing. By comminuted I intend to include the condition of the extract in the form of grains, powder, flakes or other subdivided form assumed by the dry extract. The resulting product is a beverage extract in granular or comminuted form, and of extreme solubility in water, either hot or cold, and when a heaping teaspoonful of the extract is dissolved in a cup of hot water, solution is effected in one minute or less, and produces a beverage having the pleasent blended flavors of the original roasted materials. The dry extract, while varying somewhat in color, is usually amber brown to black, and is semi-transparent on the fractured edges of the granules when they are prepared as above described.

What is claimed is:—

1. A solid soluble extract for preparing beverages, consisting of extractive matter in comminuted condition of a roasted cereal and a caramelized saccharine body.

2. A solid soluble extract for preparing beverages, consisting of extractive matter in comminuted condition of roasted cereal products and a caramelized saccharine body.

3. A solid soluble extract for preparing beverages, consisting of extractive matter in comminuted form of roasted wheat and bran and caramelized molasses.

4. A solid soluble extract for preparing beverages, consisting of extractive matter in comminuted form of roasted wheat and bran and caramelized saccharine matter.

5. A solid soluble extract for preparing beverages, consisting of extractive matter in granular form of roasted wheat and bran and caramelized molasses.

6. A solid soluble extract for preparing beverages, the composition of which comprises the extractive matter of a roasted cereal and a caramelized saccharine body.

In testimony whereof I have signed this specification in the presence of two subscribing witnesses.

WILLIS H. POST.

Witnesses:
 Edwin C. Lewis,
 Geo. S. Huff.